United States Patent
Berg et al.

(10) Patent No.: US 6,590,096 B1
(45) Date of Patent: Jul. 8, 2003

(54) PROCESS FOR THE PRODUCTION OF POLYSACCHARIDE BEADS

(75) Inventors: Hans Berg, Uppsala (SE); Mats Carlsson, Bälinge (SE)

(73) Assignee: Amersham Biosciences AB, Uppsala (SE)

( * ) Notice: Subject to any disclaimer, the term of this patent is extended or adjusted under 35 U.S.C. 154(b) by 0 days.

(21) Appl. No.: 09/806,078

(22) PCT Filed: Sep. 23, 1999

(86) PCT No.: PCT/SE99/01663

§ 371 (c)(1), (2), (4) Date: May 18, 2001

(87) PCT Pub. No.: WO00/17257

PCT Pub. Date: Mar. 30, 2000

(30) Foreign Application Priority Data

Sep. 23, 1998 (SE) ................................. 9803225

(51) Int. Cl.[7] .......................... C07H 5/04; C07H 5/06; C08B 37/08; C08B 30/18; C08B 37/16
(52) U.S. Cl. ........................... 536/55.1; 536/20; 536/46; 536/103; 536/112; 536/114; 536/123.1; 536/124; 204/469
(58) Field of Search ........................... 536/20, 46, 55.1, 536/103, 112, 114, 123.1, 124; 55/67; 73/19.2; 204/469

(56) References Cited

U.S. PATENT DOCUMENTS 5,723,601 A * 3/1998 Larsson et al.

FOREIGN PATENT DOCUMENTS

| WO | WO 89/11493 | | 11/1989 |
|---|---|---|---|
| WO | WO 93/19115 | * | 9/1993 |
| WO | WO 96/02577 | | 2/1996 |

* cited by examiner

*Primary Examiner*—James O. Wilson
*Assistant Examiner*—Traviss C. McIntosh, III
(74) *Attorney, Agent, or Firm*—Royal N. Ronning, Jr.; Stephen G. Ryan

(57) ABSTRACT

The present invention relates to a method for producing porous polysaccharide beads, comprising: (a) mixing a water-based solution of a polysaccharide under stirring with an essentially water-immiscible first organic phase to form an emulsion which separates into two continuous phases; (b) adding a second organic phase comprising an emulsifier and an organic solvent to form a three-phase system; (c) allowing the three-phase system to emulsify; and (d) decreasing the temperature below the gelling point of the polysaccharide, thereby obtaining beads having two sets of pores, said method being characterised in that the emulsifier is a water-insoluble polymer capable of stabilizing said three-phase system.

5 Claims, No Drawings

PROCESS FOR THE PRODUCTION OF POLYSACCHARIDE BEADS

This application is a 371 of PCT/SE99/01663, filed Sep. 23, 1999.

TECHNICAL FIELD

The present invention relates to methods for producing porous polysaccharide beads.

BACKGROUND ART

Polysaccharide gels are known to play an important role in the manufacture of materials for separation of mixtures of biomolecules. Among the characteristics making these gels interesting can be mentioned their inertness in contact with proteins and other biomolecules, and their porous structure. A further important property is their resistance against alkaline conditions, which is of great importance in large scale separation processes requiring frequent regeneration and sterilisation of the gel. Polysaccharide gels, unlike many other separation materials, allow in situ regeneration with alkaline agents, e.g. sodium hydroxide.

In many chromatography methods, such as gel filtration, ion exchange chromatography and affinity chromatography, polysaccharide gels are preferred because of their inertness and well established derivatisation chemistry. However, polysaccharide gels also exhibit certain drawbacks, like the limited mechanical stability. This is not a real problem when comparatively large gel beads. (around 100 µm) are used in traditional chromatography. The situation is different when attempts are made to increase the separation efficacy by the use of smaller gel beads (5–20 µm). At flow rates optimal for diffusion, the pressure drop in the gel bed is so high that the polysaccharide beads will collapse.

As a solution to the problem how to increase the separation efficacy, polysaccharide gels which contain two types of pores, small diameter diffusion pores (micropores), and large diameter flow-trough pores (macropores or superpores), have been disclosed (WO 93/19115). Such "superporous" gels are manufactured by a method wherein a water-based solution of the polysaccharide is mixed, under controlled stirring, with an essentially water-immiscible organic phase to form an oil-in-water emulsion, which when allowed to solidify forms a network of two continuous phases; an aqueous polysaccharide phase and an organic phase. The aqueous phase forms a solid matrix, while the organic phase forms a network of flow-through pores within the matrix. Simultaneously, conventional small diameter diffusion pores are formed in the aqueous phase.

In order to obtain polysaccharide beads, the oil-in-water emulsion is emulsified in a second organic phase to give a three-phase system, comprising polysaccharide droplets in the organic phase. When the temperature is decreased below the gelling temperature of the polysaccharide, beads having the said two types of pores are obtained. In addition to smaller pores (diffusion pores normally around 20 to 500 Å), which are typical for polysaccharides, the formed gel thus also contains larger pores ("superpores" or "flow-through pores, normally between 5 and 100 µm).

When this superporous material is packed in a chromatographic column, some of the flow will pass via the superpores. The biomolecules to be separated are thus transported also to the inner parts of the beads by convective flow, which is a faster way of transportation than diffusion. Only short distances will have to be covered by diffusion in the superporous material and the particles will therefore, in spite of a much larger particle size, be as effective as conventional polysaccharide beads, and still give rise to a much lower pressure drop over the gel bed.

However, the presently known method for producing superporous gels has the drawback that this kind of three-phase system is unstable and has to be immediately stabilised by cooling in order to form superporous beads. There is thus a need for an improved method for manufacture of superporous gels or beads, which provides increased stability during the emulsifying process and which allows for large-scale production.

DISCLOSURE OF THE INVENTION

It has surprisingly been found that superporous polysaccharide beads as defined above can be conveniently produced by a method in which the above-mentioned drawbacks can be minimized.

Consequently, in a first aspect this invention provides a method for producing porous polysaccharide beads, comprising (a) mixing a water-based solution (aqueous solution) of a polysaccharide under controlled stirring with an essentially water-immiscible first organic phase to form an emulsion (emulsion 1) which when allowed to solidify separates into a network of two continuous phases;

(b) adding a second organic phase comprising an emulsifier I and an organic solvent to form a three-phase system;

(c) allowing the said three-phase system to emulsify (formation of emulsion 2); and (d) decreasing the temperature below the gelling point of the said polysaccharide, thereby obtaining beads having two sets of pores as defined above.

The method is characterised in that emulsifier I is a water-insoluble polymer capable of stabilising emulsion 2.

The two-phase system obtained in step (a) (Emulsion 1) can be produced by methods known from WO 93/19115. Briefly, a water-based polysaccharide phase is mixed, under vigorous stirring, with an essentially water-immiscible organic phase, consisting of one or more components, usually an organic solvent preferably together with an emulsifier of the type stabilising "oil-in-water" systems (emulsifier II).

The skilled person will be able to determine by known methods whether Emulsion 1 will be suitable for preparation of superporous beads. Rapid tests are available for verifying that a given combination of features will give a system suitable for the preparation of the desired material. One test involves study of Emulsion 1 under a microscope. The crucial factor is that the two phases must form a network of two continuous phases upon cooling. Another test involves a function test of pore flow. A small sample of Emulsion 1 is solidified and a thin (about 1 mm) gel slice is prepared. The gel slice is placed on a supporting net and a water jet is directed to the gel surface. If suitable super pores are present, the water jet will readily displace the organic phase in the gel slice. The appearance of the gel slice will change from white to semi-transparent in this process.

Emulsifier I stabilises emulsion 2 by being capable of adsorbing to the droplets of emulsion 1 in the second organic phase, thereby preventing destabilisation of the droplets by diffusion of the inner oil phase to the outer oil phase.

There is a large number of water-insoluble polymers that can be used as emulsifier I. Each candidate to be used can be prechecked, for instance by running the experimental protocol outlined in the experimental part. The proper functioning of a candidate will give rise to beads with flow-through pores also after prolonged emulsification. Flow-through pores can be detected either by ESEM (Environmental Scanning Electron Microscopy) or simply by visual inspection of the beads. Visual inspection: Transparent beads means that flow-through pores are absent while "milky" beads means that flow-through pores are present.

Initially the following water-insoluble polymers were of potential interest: Polybutadiene, polyisoprene, polyisobutene, polyacrylates, polymetacrylates, poly(vinyl acetate), polystyrene, polypropene oxide, polytetrahydrofurane, polycarbonate, non-crystalline polyesters, polydimethylsiloxan, ethyl cellulose, cellulose ethers, PEG-polyhydroxystearic acid block copolymers (Hypermer), styrene-butadiene/isoprene block copolymers (Kraton), water-insoluble ethylene oxide-propylene oxide block copolymers (Pluronics), ethylene oxide-tetrahydrofuran block copolymers (Berol).

Preferably, emulsifier I is selected from ethyl celluloses or polyvinyl acetates or other polymers having similar balance between hydrophilicity and hydrophobicity.

Polymers used as emulsifier I, should preferably contain at least 20, such as at least 30, monomeric units. When the polymer is an ethyl cellulose or a polyvinylacetate, the molecular weight of the polymer should preferably be above 7000 Da.

The organic solvent used in the first and second organic phase (step a and b, respectively) can e.g. be cyclohexane, toluene or heptane, or a mixture. Preferably, the said organic solvent is toluene. The organic solvent used in step a and step b may be the same or different.

It is an important aspect of the invention that the said three-phase system can be allowed to emulsify during a time period of more than 40 min, preferably around 1 hour, before the temperature is decreased below the gelling point of the said polysaccharide.

Different polysaccharides can be used in the methods according to the invention for production of superporous beads. Examples of suitable polysaccharides are agar, agarose, alginate, dextran, carrageenan, chitosan, cellulose and starch, as well as mixtures of these. The actual choice of polysaccharide will depend on the desired properties of the final product, for instance with regard to pore size, charge, stability in various media, cost, etc. Agarose is preferred, since it is essentially non-ionic and inert towards proteins.

If so required the polysaccharide is derivatized to have the proper solidifying/gelling properties.

As mentioned above, the obtained superporous beads have two sets of pores. The term "two sets of pores" is intended to mean that the formed polysaccharide beads comprise (1) a first set of pores (superpores) essentially being above the size of diffusion pores, for instance between 5 and 100 μm, and
(2) a second set of pores essentially being diffusion pores, for instance with a size between 20 and 521 Å.

Typically the ratio between the pore diameters of the first set of pores and the particle diameter is in the interval 0.01–0.3, with preference for 0.05–0.2. The ratio between the pore diameters of the second set and the particle diameter may in the preferred variants extend up to 0.05 but is otherwise below 0.01.

The polysaccharide beads manufactured according to the invention have the same utility as the known gels disclosed in WO 93/19115. They can be produced in various shapes, e.g. more or less regular beads, and can be used in the manufacture of chromatographic media and as a carrier matrix for various biomolecules, like cells, enzymes, antibodies, etc. Because of its improved properties, superporous beads are particularly useful for high-performance liquid chromatography (HPLC).

After cooling the formed gel may be cross-linked and/or further derivatized in the same manner as described in WO 93/19115. Further derivatization encompasses among others that affinity groups are attached to the beads. An affinity group is a member of an affinity pair. Well-known affinity pairs are (a) positively and negatively entities (ion exchange; the immobilised entity being selected among primary, secondary, tertiary and quaternary ammonium, sulphonate, sulphate, phosphonate, phosphate, carboxy etc groups),
(b) antibodies and antigens/haptens,
(c) lectins and carbohydrate structures,
(d) IgG binding proteins and IgG,
(e) pair of hydrophobic groups,
(f) polymeric chelators and chelates,
(g) complementary nucleic acids, etc.

Affinity members also include entities participating in catalytic reactions, for instance enzymes, enzyme substrates, cofactors, cosubstrates etc: Members of affinity pairs include chemically produced mimetics of biomolecules.

Potentially affinity groups may also be attached to the polysaccharide before it is used for preparing beads according to the invention.

EXAMPLES

Synthesis of "Emulsion 1"

Solution A:

An agarose solution is prepared in a batch reactor by adding 40 g agarose to 600 ml distilled water under stirring at +95° C. After 2 hours, the solution is cooled to +70° C. NaOH (3 ml, 50%) and 8 ml allylglycidyl ether are added to the agarose solution. The reaction is allowed to continue for 2 hours under stirring at +70° C. The solution is then neutralised with acetic acid (pH 7–8).

Solution B:

10 g of the surfactant polyoxyethylene sorbitan mono-oleate (Tween 20™) is suspended in 150 ml cyclohexane under stirring at +70° C. Immediately before further use it is stirred vigorously.

Solution B is then mixed with 320 g of Solution A in the batch reactor under stirring (700 rpm) for 10 minutes at +70° C. A white viscous emulsion ("Emulsion 1") is obtained.

Synthesis of Superporous Beads

The second organic phase (the emulsion media) is made in an emulsions reactor by adding 18 g ethyl cellulose (N-50 emulsifier) to 450 ml toluene under stirring at +70° C. The dissolving of N-50 in toluene takes approximately 2 hours.

The stirring is adjusted to 90 rpm. "Emulsion 1" is transferred to the emulsion media, whereby drops of "Emulsion 1" are formed. After 1 hour of emulsification, the mixture is cooled during approximately 30 min to below +25° C. Spherical, superporous particles are obtained.

The gel particles are washed under stirring with ethanol 99.5% witch is decanted. The gel is then washed on a glass filter with ethanol 99.5% and distilled water. The particles were analysed by ESEM (Environmental Scanning Electron Microscopy) which showed that the gel particles contained flow-trough pores (superpores). Visual inspection showed that the beads were milky and non-transparent.

It is clear from the above example that emulsification and cooling of the three-phase system could be allowed to take place during a relatively long time (1 hour and 30 min, respectively). This is in contrast to the known method for preparing superporous gels, disclosed in WO 93/19115. In Example 3 of WO 93/19115, 100 ml of "Emulsion 1" is poured into 200 ml cyclohexane containing 4% (v/v) Span 85 (sorbitan trioleate) as the detergent. With this method, the mixture had to be cooled immediately (after only 0.5 min of emulsification) in order for superporous beads to be formed.

Consequently, the method according to the present invention is superior compared to the previously known method as it provides increased stability during the emulsifying process, which makes it more suitable for large-scale synthesis of superporous beads.

Experiments Made During the Priority Year

The same experimenatl protocol as for ethyl cellulose above was carried out for Poly(vinyl acetate) having Mw 83 000 and 50 000 (Aldrich Chemical Company, Inc., U.S.A.).
Solution A:
  300 ml distilled water, 20 g agarose, 1,5 ml 50% NaOH (w/w), 4 ml allyl glycidyl ether.
Solution B:
  12 g Tween 20, 150 ml cyclohexane.
Second organic phase:
  105 g poly(vinyl acetate) (Mw 83 000) or 40 g poly(vinyl acetate) (Mw 50 000) in 225 ml toluene plus 100 ml ethylene dichloride.

The resultant beads were "milky" and nontransparent indicating presence of flow-through pores.

Experiments were also run with poly(butadiene) (Mw 4500) (Janssens Chimica, Belgium) and Polystyrene (Mw 20 000) (Polyscience Inc., USA). In both cases the beads obtained were transparent indicating that essentially no flow-through pores had been formed.

What is claimed is:

1. A method for producing porous polysaccharide beads, comprising
   (a) mixing a water-based solution of a polysaccharide under stirring with an essentially water-immiscible first organic phase to form an emulsion which separates into two continuous phases;
   (b) adding a second organic phase comprising an emulsifier and an organic solvent to form a three-phase system;
   (c) allowing the three-phase system to emulsify; and
   (d) decreasing the temperature below the gelling point of the said polysaccharide, thereby obtaining beads having two sets of pores, wherein the emulsifier in said method is a water-insoluble polymer capable of stabilizing said three-phase system for a time period of more than 40 minutes, wherein said emulsifier is selected from ethyl cellulose or poly(vinyl acetate).

2. The method according to claim 1, wherein the formed polysaccharide beads comprise one set of pores with a size between 20 and 500 Å, and another set of pores with a size between 5 and 100 $\mu$m.

3. The method according to claim 1, wherein the three-phase system is emulsified for a time period of more than 40 minutes.

4. The method according to claim 1, wherein the polysaccharide is agarose.

5. The method according to claim 1, wherein the organic solvent is toluene.

* * * * *